(12) United States Patent
Kalathur et al.

(10) Patent No.: US 10,750,022 B2
(45) Date of Patent: Aug. 18, 2020

(54) ENHANCING CUSTOMER SERVICE PROCESSING USING DATA ANALYTICS AND COGNITIVE COMPUTING

(71) Applicant: INTERNATIONAL BUSINESS MACHINES CORPORATION, Armonk, NY (US)

(72) Inventors: Vijai Kalathur, Wappingers Falls, NY (US); Rajaram B. Krishnamurthy, Pleasant Valley, NY (US); Robert J. C. Paquin, Wappingers Falls, NY (US); Philip A. Siconolfi, Wappingers Falls, NY (US); Moses J. Vaughan, Mahwah, NJ (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 86 days.

(21) Appl. No.: 15/441,527

(22) Filed: Feb. 24, 2017

(65) Prior Publication Data
US 2018/0139327 A1 May 17, 2018

Related U.S. Application Data

(63) Continuation of application No. 15/354,728, filed on Nov. 17, 2016.

(51) Int. Cl.
*H04M 3/00* (2006.01)
*H04M 5/00* (2006.01)
(Continued)

(52) U.S. Cl.
CPC .. *H04M 3/5232* (2013.01); *G06Q 10/063112* (2013.01); *G06Q 30/016* (2013.01);
(Continued)

(58) Field of Classification Search
CPC ............. H04M 3/5175; H04M 3/5233; H04M 3/5183; H04M 3/5166; H04M 3/5191;
(Continued)

(56) References Cited

U.S. PATENT DOCUMENTS

| | | | | |
|---|---|---|---|---|
| 6,480,826 B2 * | 11/2002 | Pertrushin | ............... | G10L 17/26 704/270 |
| 6,724,887 B1 * | 4/2004 | Eilbacher | ............ | H04M 3/5183 379/265.02 |

(Continued)

OTHER PUBLICATIONS

List of IBM Patents or Patent Applications Treated as Related; (Appendix P), Filed Feb. 24, 2017; 2 pages.

(Continued)

*Primary Examiner* — Ahmad F. Matar
*Assistant Examiner* — Kharye Pope
(74) *Attorney, Agent, or Firm* — Cantor Colburn LLP; Teddi Maranzano

(57) ABSTRACT

Embodiments include method, systems and computer program products for enhancing a customer service process. Aspects include receiving customer data associated with a customer and creating a customer profile based on the customer data. Aspects also include obtaining customer service representative data comprising a customer service profile for each of a plurality of customer service representatives and determining a matching subset of the plurality of customer service representatives for the customer based upon the customer profile and the customer service representative data. Next, aspects include displaying, to the customer, the matching subset of the plurality of customer services representatives for the customer. Aspects also include selecting a first customer service representative from the matching subset of the plurality of customer service representatives for the customer based on a customer input.

9 Claims, 6 Drawing Sheets

(51) Int. Cl.
*G06Q 10/00* (2012.01)
*H04M 3/523* (2006.01)
*G06Q 10/06* (2012.01)
*G06Q 30/00* (2012.01)
*H04M 3/42* (2006.01)
*H04L 29/08* (2006.01)
*H04M 3/51* (2006.01)

(52) U.S. Cl.
CPC ...... *H04L 67/306* (2013.01); *H04M 3/42068* (2013.01); *H04M 3/5191* (2013.01); *H04M 2201/18* (2013.01); *H04M 2203/256* (2013.01); *H04M 2203/408* (2013.01); *H04M 2203/555* (2013.01); *H04M 2250/12* (2013.01)

(58) Field of Classification Search
CPC ......... H04M 2203/401; H04M 3/5235; H04M 3/5232; H04M 3/51; H04M 3/523; H04M 2203/402; H04M 3/4936; H04M 3/5238; H04M 2201/40; H04M 3/2218; G06Q 30/016; G06Q 10/063112; G06Q 10/0639; G06Q 10/06393; G06Q 10/06398; G06Q 50/01; G06F 21/32; G06F 3/167; G06F 3/015; H04L 63/0861; H04L 67/306; H04L 9/3231
USPC ............ 379/265.12, 265.09, 265.11, 265.13, 379/88.01; 705/304
See application file for complete search history.

(56) References Cited

U.S. PATENT DOCUMENTS

| | | | | |
|---|---|---|---|---|
| 7,027,586 | B2 * | 4/2006 | Bushey | H04M 3/5191 |
| | | | | 379/265.09 |
| 7,564,962 | B1 * | 7/2009 | O'Keeffe | H04M 3/5191 |
| | | | | 370/401 |
| 9,178,999 | B1 | 11/2015 | Hegde et al. | |
| 9,794,412 | B2 | 10/2017 | Saushkin et al. | |
| 2005/0193055 | A1 * | 9/2005 | Angel | G06Q 30/02 |
| | | | | 709/202 |
| 2006/0262919 | A1 * | 11/2006 | Danson | G10L 15/1822 |
| | | | | 379/265.02 |
| 2007/0127692 | A1 * | 6/2007 | Varadarajan | G06Q 10/0639 |
| | | | | 379/265.06 |
| 2011/0307402 | A1 * | 12/2011 | Krishnakumar | G06Q 10/105 |
| | | | | 705/321 |
| 2012/0101865 | A1 * | 4/2012 | Zhakov | G06Q 10/06311 |
| | | | | 705/7.13 |
| 2012/0284080 | A1 | 11/2012 | De Oliveira et al. | |
| 2013/0173687 | A1 | 7/2013 | Tuchman et al. | |
| 2013/0198039 | A1 * | 8/2013 | Sridharan | G06Q 30/016 |
| | | | | 705/26.44 |
| 2013/0282417 | A1 * | 10/2013 | Gaedcke | G06Q 30/016 |
| | | | | 705/7.13 |
| 2014/0119531 | A1 | 5/2014 | Tuchman et al. | |
| 2014/0164257 | A1 * | 6/2014 | Brown | G06Q 30/016 |
| | | | | 705/304 |
| 2014/0220526 | A1 | 8/2014 | Sylves | |
| 2014/0314225 | A1 * | 10/2014 | Riahi | G06Q 30/02 |
| | | | | 379/265.09 |
| 2015/0142446 | A1 * | 5/2015 | Gopinathan | G06Q 40/025 |
| | | | | 704/270 |
| 2015/0178660 | A1 | 6/2015 | Nowak et al. | |
| 2015/0242860 | A1 | 8/2015 | Kannan et al. | |
| 2015/0256676 | A1 * | 9/2015 | Famous | H04M 3/42068 |
| | | | | 379/265.09 |
| 2015/0294216 | A1 | 10/2015 | Baughman et al. | |
| 2015/0304492 | A1 * | 10/2015 | Eyeson | H04M 3/5175 |
| | | | | 379/265.1 |
| 2016/0171557 | A1 * | 6/2016 | Fanous | G06F 16/9535 |
| | | | | 705/14.66 |
| 2016/0191712 | A1 | 6/2016 | Bouzid et al. | |
| 2016/0212267 | A1 * | 7/2016 | Ma | H04M 3/493 |
| 2017/0345035 | A1 * | 11/2017 | Zeng | G06N 99/005 |
| 2018/0007203 | A1 * | 1/2018 | Batlle | H04M 3/5191 |
| 2018/0139326 | A1 | 5/2018 | Kalathur et al. | |

OTHER PUBLICATIONS

Vijai Kalathur et al., "Enhancing Customer Service Processing Using Data Analytics and Cognitive Computing", U.S. Appl. No. 15/354,728, filed Nov. 17, 2016.

Anonymous, A Self-Adapting Mobile App Market Interaction Method and System, ip.com No. IPCOM000240051D, IP.com publication date Dec. 29, 2014.

Anonymous, Method and System for Determining a Customer's Desire for Assistance and Dispatching an Associate to Provide Assistance, ip.com No. IPCOM000236118D, ip.com publication date: Apr. 7, 2014.

List of IBM Patents or Patent Applications Treated as Related; (Appendix P), Filed Jul. 1, 2019; 2 pages.

Fischer, et al., "Cognitive-Linguistics-Based Request Answer System", Adaptive Multimedia Retrieval, Understanding Media and Adapting to the User, 7th International Workshop, Revised Selected Papers, pp. 135-146; 2009.

* cited by examiner

ENHANCING CUSTOMER SERVICE PROCESSING USING DATA ANALYTICS AND COGNITIVE COMPUTING

DOMESTIC PRIORITY

This application is a continuation of and claims priority to U.S. Non-provisional application Ser. No. 15/354,728, filed on Nov. 17, 2016, entitled "ENHANCING CUSTOMER SERVICE PROCESS USING DATA ANALYTICS AND COGNITIVE COMPUTING," assigned to the assignee hereof and expressly incorporated by reference herein.

BACKGROUND

The present disclosure relates to enhancing a customer service process, and more specifically, to enhancing customer service processing using data analytics and cognitive computing.

Each year, millions of customers contact various organizations' customer support lines to report issues and seek resolution for their issues. A customer support session does not always result in a resolution or a positive experience for a customer as the customer is forced to navigate through a menu before reaching an actual customer service representative. Multiple layers are presented to the customer to assist in routing the customer to an appropriate customer service representative that often times leaves the customer frustrated with this tedious process. This frustration is compounded by dropped calls and not finding an appropriate customer service representative capable of handling the customer's issues.

SUMMARY

Embodiments include a computer-implemented method for enhancing a customer service process. The method includes receiving customer data associated with a customer and creating a customer profile based on the customer data. The method also includes obtaining customer service representative data comprising a customer service profile for each of a plurality of customer service representatives and determining a matching subset of the plurality of customer service representatives for the customer based upon the customer profile and the customer service representative data. Next, the method includes displaying, to the customer, the matching subset of the plurality of customer services representatives for the customer. The method also includes selecting a first customer service representative from the matching subset of the plurality of customer service representatives for the customer based on a customer input.

Embodiments include a computer system for enhancing a customer service process, the computer system including a processor, the processor configured to perform a method. The method includes receiving customer data associated with a customer and creating a customer profile based on the customer data. The method also includes obtaining customer service representative data comprising a customer service profile for each of a plurality of customer service representatives and determining a matching subset of the plurality of customer service representatives for the customer based upon the customer profile and the customer service representative data. Next, the method includes displaying, to the customer, the matching subset of the plurality of customer services representatives for the customer. The method also includes selecting a first customer service representative from the matching subset of the plurality of customer service representatives for the customer based on a customer input.

Embodiments also include a computer program product for enhancing a customer service process, the computer program product including a non-transitory computer readable storage medium having computer readable program code embodied therewith. The computer readable program code including computer readable program code configured to perform a method. The method includes receiving customer data associated with a customer and creating a customer profile based on the customer data. The method also includes obtaining customer service representative data comprising a customer service profile for each of a plurality of customer service representatives and determining a matching subset of the plurality of customer service representatives for the customer based upon the customer profile and the customer service representative data. Next, the method includes displaying, to the customer, the matching subset of the plurality of customer services representatives for the customer. The method also includes selecting a first customer service representative from the matching subset of the plurality of customer service representatives for the customer based on a customer input.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Figure 1:
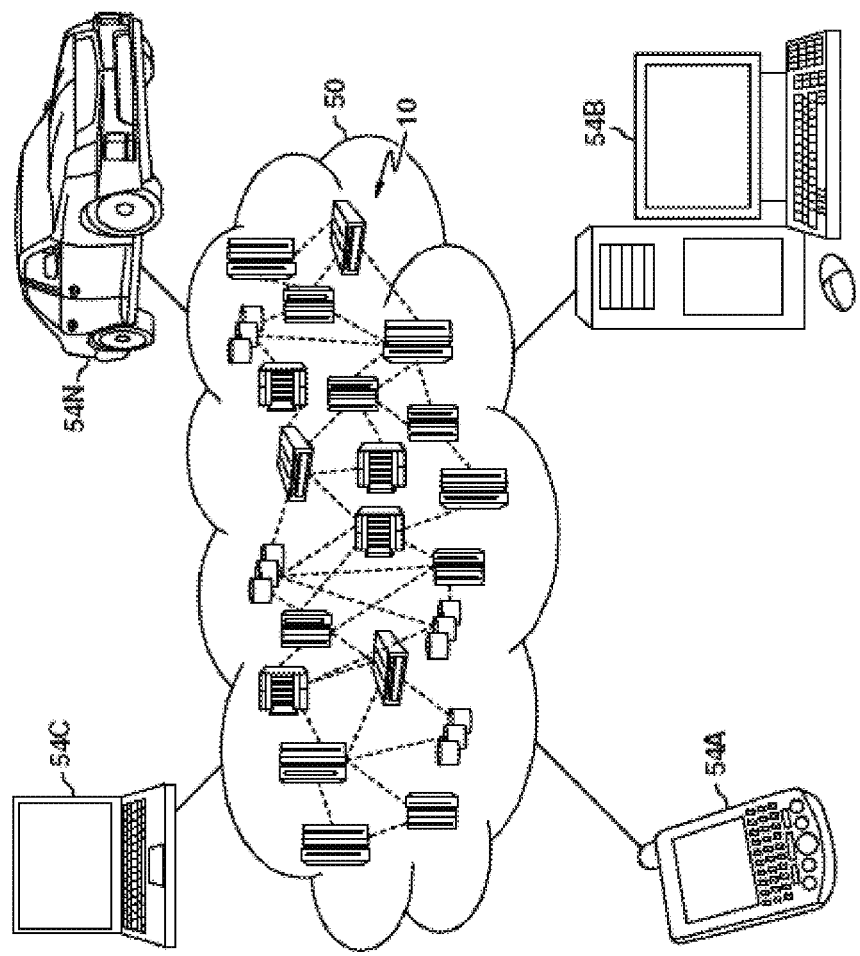
FIG. 1 depicts a cloud computing environment according to one or more embodiments of the present invention.

In accordance with exemplary embodiments of the disclosure, methods, systems and computer program products for enhancing a customer service process are provided. In one or more embodiments, aspects include matching a customer to a customer service representative through analysis of the customer's issue and personality compared to a customer service representative's personality and skill set. The customer can access a customer service portal through the use of an application on a customer device to input information such as demographic information to create a customer profile. In addition to the customer profile, the customer can input the service issues in to the portal.

Analyzing this customer profile and service issue, the portal can match the customer to one or more customer service representatives that can handle the service issue. The customer can then select a representative based upon the representative profile and service history and then be connected to this representative via telephone, instant messaging, video conferencing, or any other communication means.

This invention will provide a customer with an effective way to contact customer support and resolve their issues. The enhancements suggested will help the customer connect with the best customer service representative (CSR) based on the problem to be solved as well as the personalities and skill level of both the customer and the CSR. Once the customer is connected to the best CSR, they can access a shared screen to enable effective communication. A cognitive tone analyzer engine can be utilized to gather real time feedback from the customer and the call can be tailored based on that feedback. The consumer will have a better customer support experience and a better chance of having their problem resolved which can lead to better consumer loyalty.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
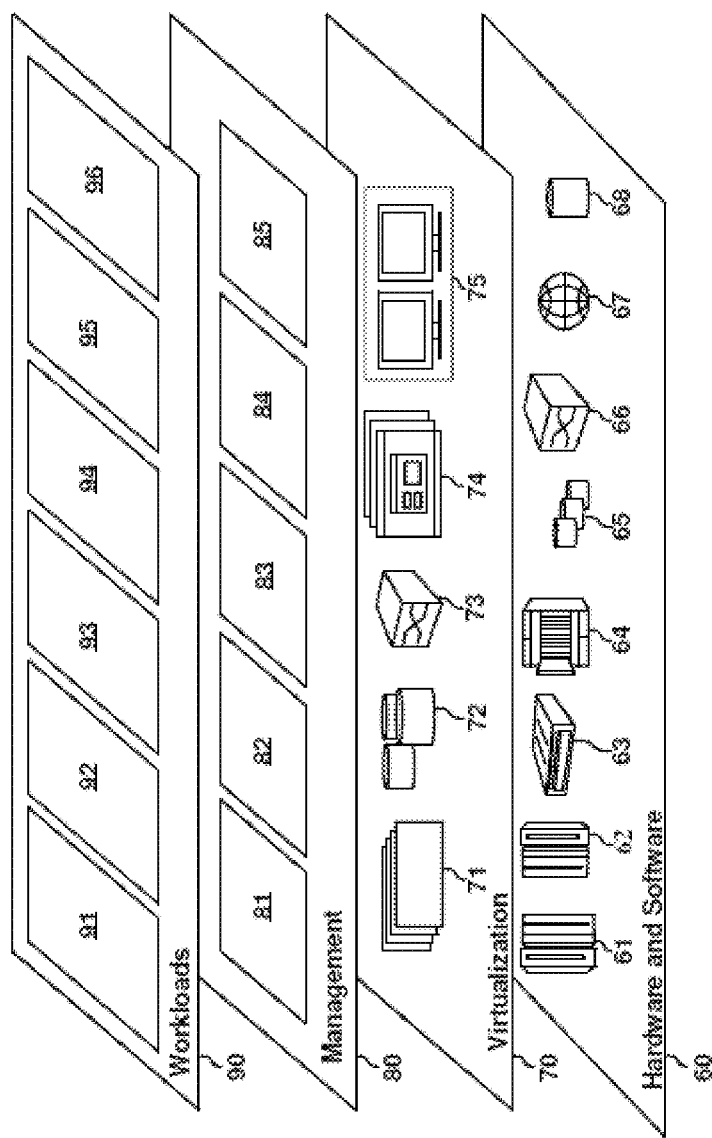
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the enhancement of a customer service process 96.

Figure 3:
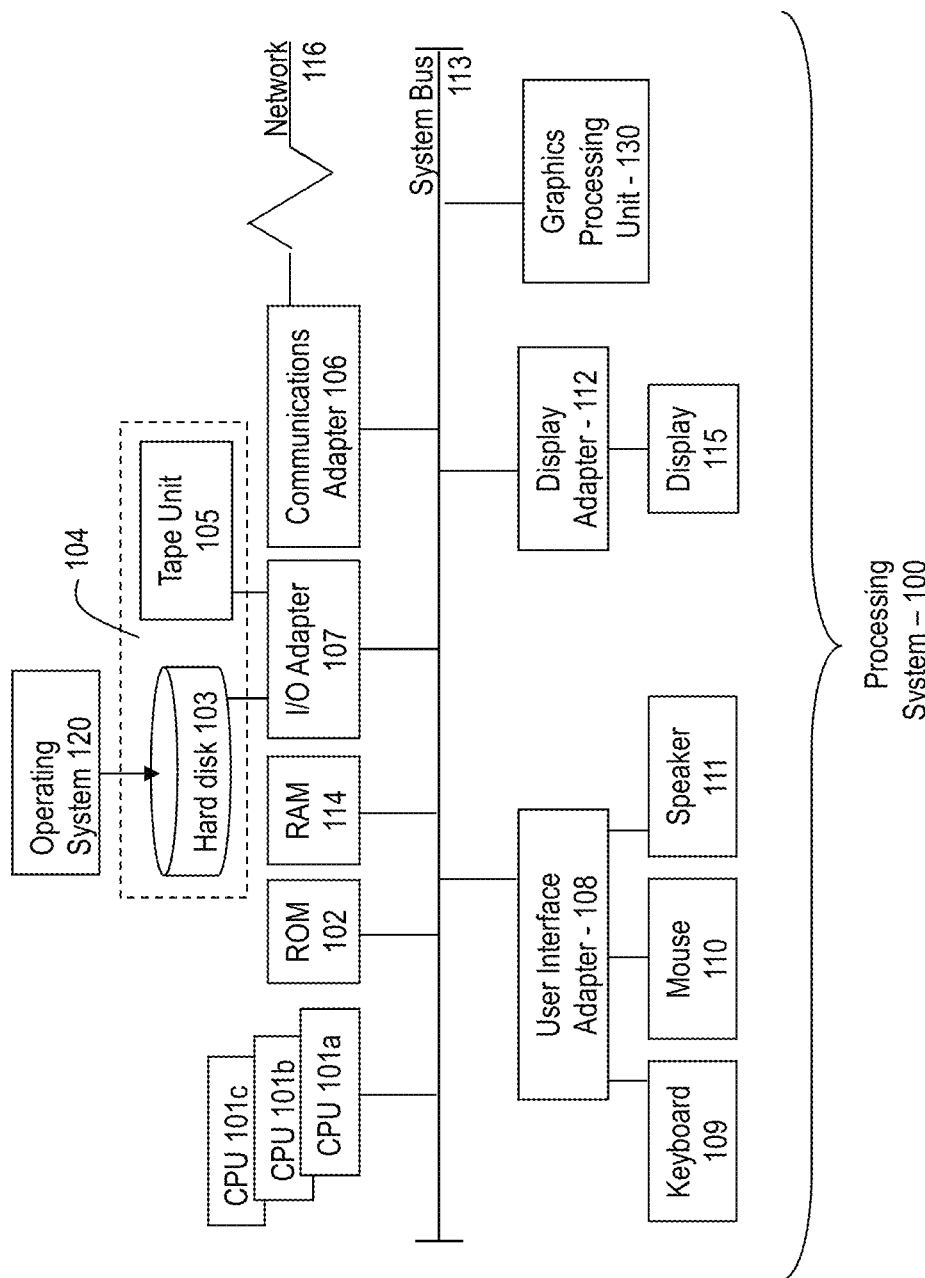
FIG. 3 illustrates a block diagram of a computer system for use in practicing the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system coordinate the functions of the various components shown in FIG. 3.

Figure 4:
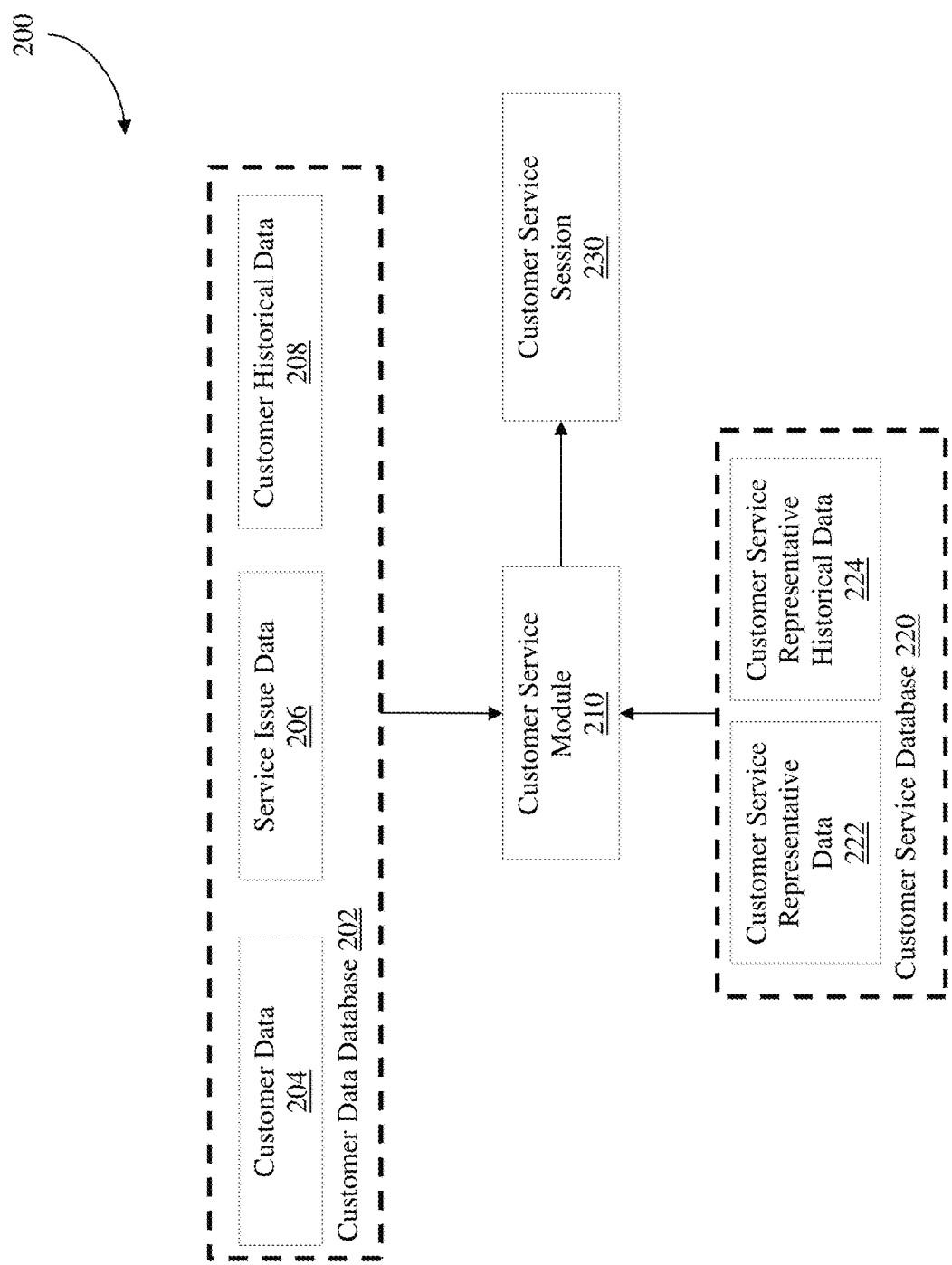
FIG. 4 illustrates a block diagram of a system for enhancing a customer service process in accordance with one or more embodiments.

FIG. 4 is a block diagram illustrating a system 200 for enhancing a customer service process according to one or more embodiments. As shown in FIG. 4, the system 200 includes a customer data database 202, a customer service database 220, a customer service module 210 and a customer service session module 230.

The customer data database 202 includes customer information such as customer data 204, service issue data 206, and customer historical data 208. The customer data 204 can be taken from the customer directly either over the phone or through input into an application on a smart device such a phone or tablet. The customer data 204 can include demographic data such as age, location, education and income level and the like. The customer data 204 can also include customer preferences for a customer service representative such as time zone location, expertise, work history and experience, and any other preference for handling a customer service issue. Customer data 204 also includes input taken from the customer via a smart device. Also stored in the customer data database 202 is service issue data 206 that includes information associated with the service request such as type of service issue, type of technology or equipment for the service issue, and an urgency or a rating associated with the service request. The customer historical data 208 can include the historical service requests by the customer, any reviews or ratings of customer service representatives, historic resolutions of previous service requests and the like. The customer data 204, the service issue data 206, and customer historical data 208, individually or in combination, can be utilized to create a customer profile that is utilized to match the customer to a customer service representative via the customer service module 210.

The customer service database 220 includes customer service information such as customer service representative data 222 and customer service representative historical data 224. The customer service representative data 220 can include work history, work experience, expertise, any personality assessments, and demographic data about the customer service representative. The customer service representative historical data 224 can include previous customer service ratings by customers, past service resolutions by the representative, and the like. The customer service representative data 222 and the customer service representative historical data, individually or in combination, can be utilized to create a customer service representative profile that is utilized to match a customer service representative to the customer via the customer service module 210.

The customer service module 210 analyzes the customer profile and compares it to the customer service representatives' profiles to identify one or more matching profiles that can handle the customer service request from a customer. When the one or more matching profiles are identified, these profiles can be presented to the customer via a smart device or other display screen for a selection input from the customer. The customer service module 210 can connect the customer to a customer service representative based upon the customer input. For example, a list of customer service profiles can be presented to a customer on a tablet and the customer can select from the list based upon the customer service profile. Information displayed in the customer service representative profile can include wait time, location data, specialty, ratings and reviews, work history and experience, and demographic data about the customer service representative. For example, a customer may wish to speak with a customer service representative who is nearby to the location of the customer so that the customer may select a representative based upon his or her location. Additionally, the customer service profile data includes information about the all-around experience latency such as network ping times, voice delay response timings, voice echoes, overall phone quality, and the like.

The customer service module 210 can create a match score for each customer service representative's profile based upon the analysis comparing the customer profile to the customer service representatives' profiles. This match score can be a numerical score and a minimum threshold value can be established wherein any customer service profile match score below the minimum threshold value will be excluded from a list of available customer service representatives for the customer to select. Additionally, the customer service module 210 can automatically select from the highest match score from the list of available customer service representatives to match to the customer for the service request.

When a customer service represented is selected either by the customer or automatically based on the match score, the customer is connected to the customer service representative in a customer service session 230.

Figure 5:
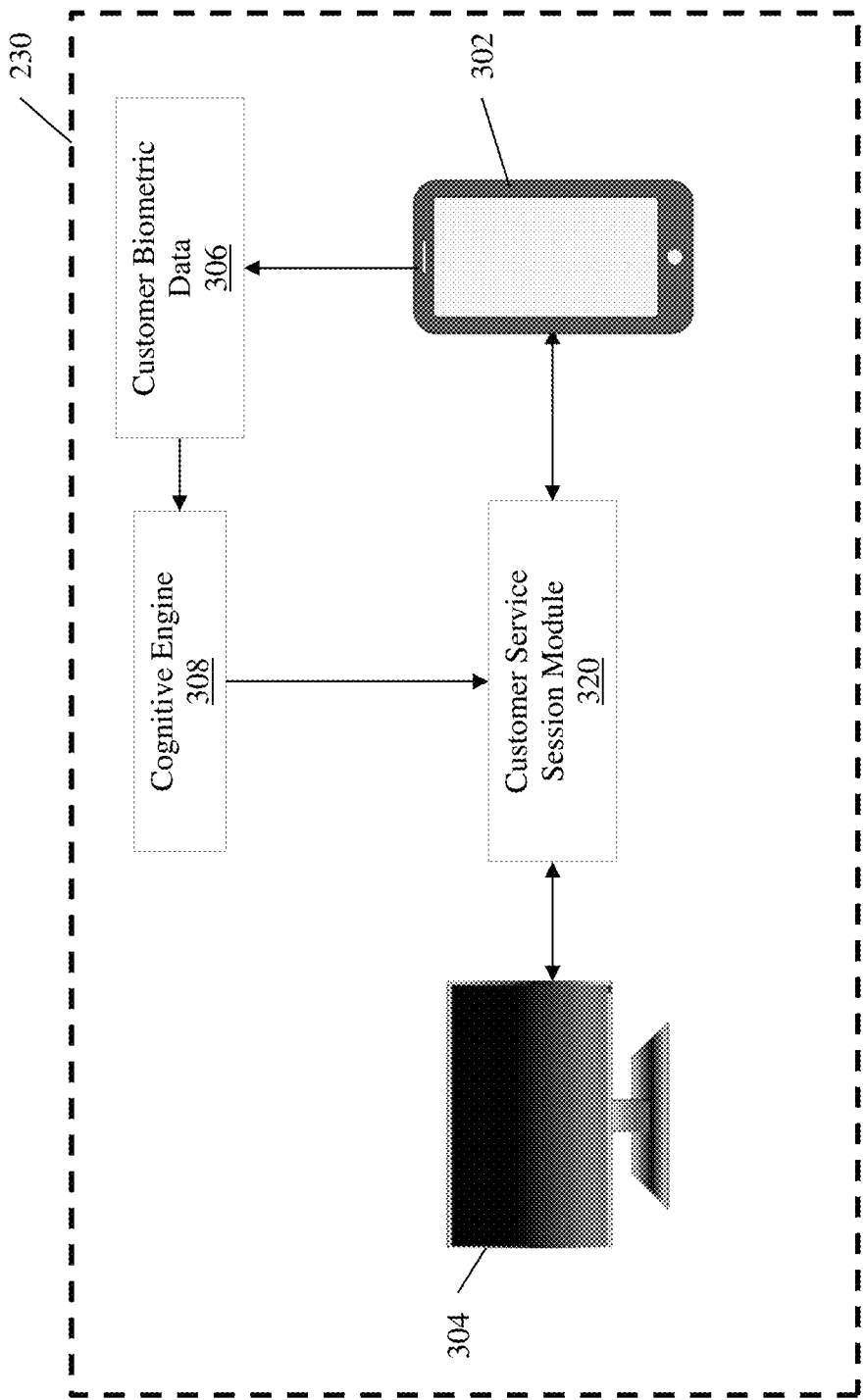
FIG. 5 illustrates a block diagram of a customer service session according to one or more embodiments.

FIG. 5 illustrates a customer service session 230 between a customer and a customer service representative according to one or more embodiments. The customer service session 230 can occur via the phone, instant messaging, text message, email or the like. The customer can utilize a customer device 302 such as a phone, tablet, laptop, smart watch in communication with a smart device, or any other type of device to communicate with the customer service representative. The customer service representative can utilize a device 304 such as a phone, tablet, laptop, or any other type of device to communicate with the customer. The customer device 302 is configured to accept additional customer input during the customer service session 230. This additional customer input can be received by an application on the customer device 302 that can accept the additional customer data and submit to the customer service session module 320. For example, during the customer service call, the customer may request a transfer to new customer service representative. Some additional examples include submitting a rating or review for the customer service representative, submitting a request for an audio transcript or a text transcript of the customer service session to be emailed to the customer, and submitting a request for escalation of the service issue to a supervisor or manager.

During the customer service session 230, the customer smart device 302 can collect customer biometric data 306 that includes customer tone, breathing rate, hand pressure, hand temperature, voice pitch changes, and the like. Certain customer biometric data 306 can be collected directly by the customer device 302 such as the customer's cell phone or the customer biometric data 306 can be obtained from peripheral devices in communication with the customer device 302 such as a smartwatch, fitness tracker, or other biometric sensors of the customer. For example, a smart watch can obtain biometric data such as pulse or blood pressure and determine changes in this data to communicate to the customer device 302 which in turn can be fed into a cognitive engine 308 that will determine if the customer is satisfied or unsatisfied with the customer service session 230.

The cognitive engine 308 can analyze the collected biometric data from the customer to determine whether the customer is becoming unsatisfied with the customer service session and communicate to the customer service session module 320 some suggested actions to be taken by the customer service representative to salvage the session. For example, a customer service representative can receive real-time feedback displayed on his or her device 304 to show how satisfied or angry a customer is based upon the collected customer biometric data 306. Some suggested actions can be displayed on the customer service representative device 304 such as tailoring offers for the customer or using vocal calming techniques with the customer. This real-time collection of customer biometric data 306 can also be analyzed by the cognitive engine 308 to determine a rating for the customer service session 230 for the particular customer service representative. This rating can be performed in lieu of or in conjunction with customer feedback surveys at the end of the customer service session 230.

During the customer service session 230, the customer device 302 can interact with the customer service session module 320 to share data such as images, video or text with the customer service representative device 304. In addition, the customer service representative device 304 can share a separate window that includes a transcript of the customer service session 230 in real time so that the customer service representative can review what was said, what was shared, and any past interactions with the customer to better serve the customer's service needs. The transcript can be fed through analytic tools to evaluate the transcript and to alert the customer service representative to appropriate data to assist the representative in resolving the customer issue faster. For example, certain keywords can be analyzed and common resolutions can be displayed for the representative to assist in the resolution such as a keyword like frozen screen or program that may alert the representative to have the customer reboot a device. In addition, the customer service representative can share images, videos, or text with the customer device 302 via the customer service session module 320.

In one or more embodiments, the biometric data can be compared to a threshold value. For example, if the voice tone exceeds a specific value or the voice tone exceeds a specific decibel value, this can trigger the system 200 to present to the customer a feedback questionnaire or present the customer with a list of alternative customer service representatives to be transferred to during the call. The customer can select a new representative after the collected biometric data exceeds a threshold. In another example, the threshold can be a percentage or numerical increase or decrease in biometric data such as a percentage increase in a customer's heart rate or a patient's heart rate has increased by a number of beats per minute from the start of a call.

In one or more embodiments, during the customer service session 230, the customer via the customer device 302 can submit additional inputs to control the customer service session 230. For example, if the customer is unsatisfied with the session, the customer can select an alternate customer service representative to connect to. The list of available customer service representatives can be displayed on the customer device 302 and are available to select from either before or during the customer service session 230. In addition, the customer, during the session, can select other options for the session such as escalating the session to a supervisor or manager or for rating the session experience.

The customer device 302 can have installed an application that collects customer data 204. Over time, this application can update the customer personality profile to better refine the profile for matching with a customer service representative. Additionally, based on service issue data 206, the application can display customer service representatives who have handled the same or similar issues in the past and have achieved favorable resolutions. This service history information can be displayed to the customer on the customer device 302 within the customer service representative profile so that the customer can select the customer service representative based upon the service history alone or in combination with other profile attributes.

In one or more embodiments, the customer service session 230 can be initiated by a customer utilizing an application on their customer device 302 such as a smartphone or tablet. The application will collect customer data or will access stored customer data in the application to access a customer profile. In addition to the customer profile, the service issue data 206 can be collected from the same application. The customer service module 210 will analyze both the customer profile and the service issue data 206 to determine a list of customer service representatives to display inside the application for the customer to select from. Included in the list of customer service representatives can be customer service profile data as well as service history showing experience with the same or similar issues that have resulted in a favorable resolution. For example, if a customer is troubleshooting an email application service and a list of customer service individuals shows one particular representative that has resolved over 100 issues with the same email application issue, the customer may select this particular representative. However, if there is a particular wait time for the particular representative, the customer may choose another representative that may have resolved the issue 20 times but has a much shorter wait time.

In one or more embodiments, the customer service profile can include a skill and personality profile created for each customer service representative for an organization. The customer service profile can consist of areas of expertise of the representative and a synopsis of each problem the representative has solved. The personality aspect of the customer service profile can be determined by using cognitive tools such as, for example, the Watson's Personalities Insights.

In one or more embodiments, the customer profile can be enhanced by linking the customer profile to one or more social media services of the customer to provide additional data for the cognitive engine 308 to further develop the customer personality profile.

In one or more embodiments, the customer service session module 320 can utilize real-time language translation for customers that may have a language barrier. The translation can occur on both ends of the conversation through text or audio in the application on the customer device 302.

In one or more embodiments, the customer service module 320 will store the customer contact information and relay this information to a representative should the call or session be discontinued for any reason. The representative can immediately call the customer back and resume the customer service session 230 to avoid the customer having to repeat the process to get to a representative to resolve their issue.

In one or more embodiments, the customer service session module 320 can receive as an input the language, slang and tone as dictated by the customer to update both the customer profile and the customer service representative profile. For example, if a customer utilizes a specific dialect or type of slang common to a local area, the customer may be matched up with a customer service representative that is familiar with the dialect or slang so as to better communicate. Additionally, the customer profile will be updated to notate that the customer utilizes this dialect or slang.

Figure 6:
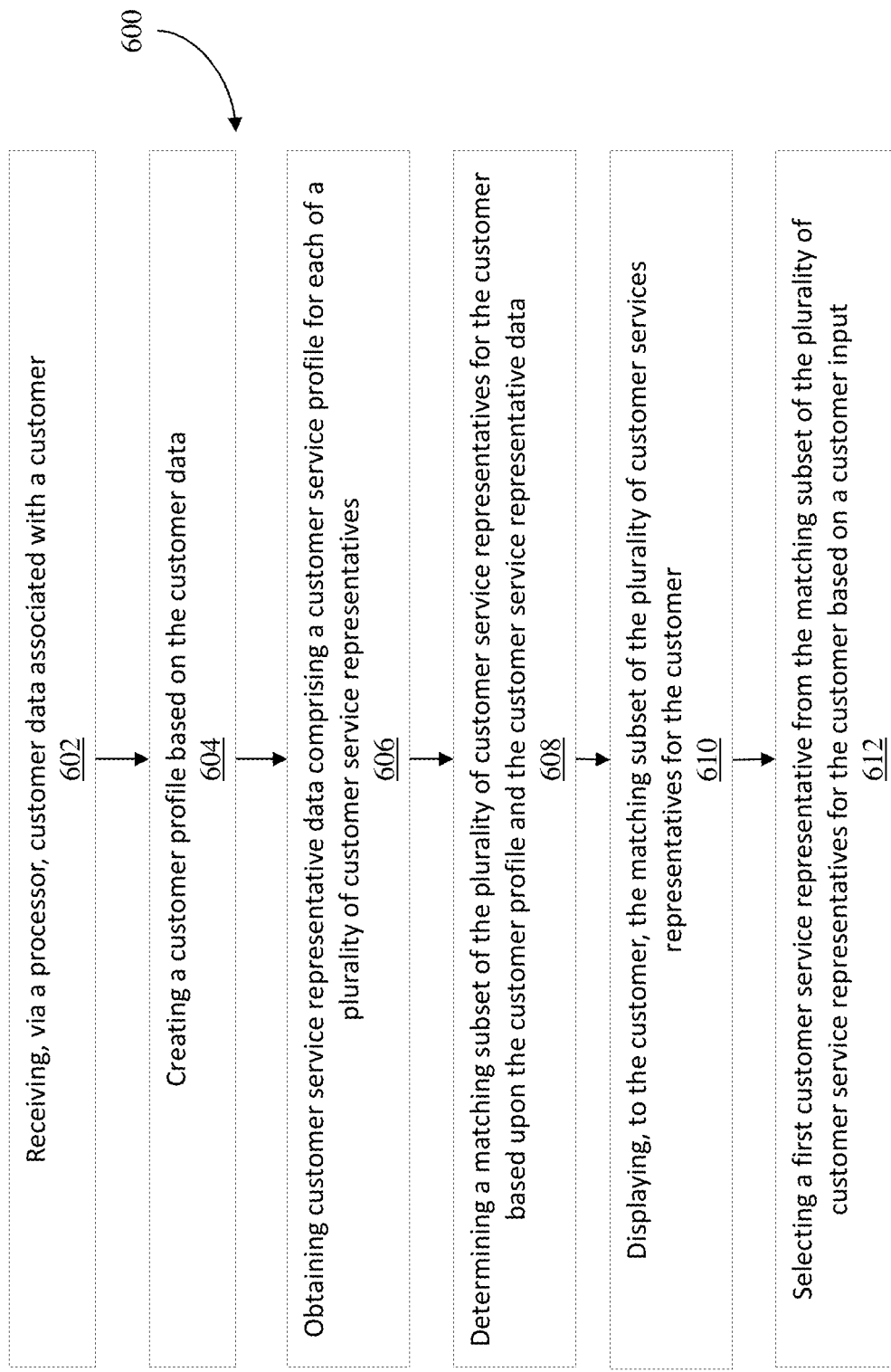
FIG. 6 illustrates a flow diagram of a method for enhancing a customer service process in accordance with one or more embodiments.

FIG. 6 illustrates a flow diagram of a method 600 for enhancing a customer service process according to one or more embodiments. As shown in block 602, the method 600 includes receiving, via a processor, customer data associated with a customer. The method 600 also includes creating a customer profile based on the customer data, shown at block 604. At block 606, the method 600 includes obtaining customer service representative data comprising a customer service profile for each of a plurality of customer service representatives. Next, at block 608, the method 600 includes determining a matching subset of the plurality of customer service representatives for the customer based upon the customer profile and the customer service representative data. The method 600 then includes displaying, to the customer, the matching subset of the plurality of customer services representatives for the customer, as shown at block 610. At block 612, the method 600 includes selecting a first customer service representative from the matching subset of the plurality of customer service representatives for the customer based on a customer input.

Additional processes may also be included. It should be understood that the processes depicted in FIG. 6 represent illustrations, and that other processes may be added or existing processes may be removed, modified, or rearranged without departing from the scope and spirit of the present disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting-data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for enhancing a customer service process, the method comprising:
    receiving, via a processor, customer data associated with a customer, wherein the customer data comprises service issue data, historical data associated with the customer, demographic data associated with the customer, and a skill level of the customer;
    creating a customer profile based on the customer data;
    determining customer service representative data comprising a customer service profile for each of a plurality of customer service representatives, wherein the customer service profile comprises a voice echoes quality score and at least one of a network ping time, a voice delay response timing, and an overall phone quality rating;
    determining a matching subset of the plurality of customer service representatives for the customer based upon the customer profile and the customer service representative data;

displaying, to the customer, the matching subset of the plurality of customer services representatives for the customer;

selecting a first customer service representative from the matching subset of the plurality of customer service representatives for the customer based on a customer input;

receive customer tone data associated with the customer to determine a level of satisfaction of the customer;

generate an alert for the first customer service representative based on the level of satisfaction of the customer;

generate an offer for the customer based at least in part on the level of satisfaction of the customer;

receiving customer biometric data from the customer to determine an emotional response of the customer;

determining a set of suggested actions based upon the emotional response of the customer;

displaying, to the first customer service representative, the set of suggested action to the first customer service representative, wherein the set of suggested actions comprise vocal calming techniques.

2. The method of claim 1, wherein the displaying the matching subset includes displaying, to the customer, a customer service profile associated with each of the matching subset of the plurality customer service representatives.

3. The method of claim 2, wherein the customer service profile associated with each of the matching subset includes at least one of a wait time, a location, an experience rating, or demographic data associated with each of the matching subset of the plurality of customer service representatives.

4. The method of claim 1, further comprising:
connecting the first customer service representative to the customer through a customer service session.

5. The method of claim 4, wherein the customer service session comprises at least one of a phone call session, an instant message session, or a video conference session.

6. The method of claim 4, further comprising:
displaying one or more options for the customer, wherein the one or more options comprise at least one of a rating for the first customer service representative, a request to transfer to a new customer service representative, or a request to receive a transcript of the customer service session.

7. The method of claim 1, further comprising:
calculating a match score for each of the matching subset of the plurality of customer service representatives based on the customer service representative data and the customer profile; and obtaining a threshold value;

wherein the displaying the matching subset of the plurality of customer service representatives for the customer is based upon a determination that the match score for each of the matching subset of the plurality of customer service representatives exceeds the threshold value.

8. The method of claim 1, wherein the customer data comprises information inputted by the customer.

9. The method of claim 1, wherein customer data comprises data acquired from one or more social media services utilized by the customer.

* * * * *